United States Patent [19]
DeClerck et al.

[11] Patent Number: 5,870,205
[45] Date of Patent: *Feb. 9, 1999

[54] METHOD AND APPARATUS FOR CORRECTING LIGHT NON-UNIFORMITY IN AN LCD PHOTOGRAPHIC PRINTER

[75] Inventors: Thomas G. DeClerck, Livonia; Curtis E. DeWolff, Fairport, both of N.Y.

[73] Assignee: Eastman Kodak Company, Rochester, N.Y.

[ * ] Notice: The term of this patent shall not extend beyond the expiration date of Pat. No. 5,754,305.

[21] Appl. No.: 758,321

[22] Filed: Dec. 3, 1996

[51] Int. Cl.$^6$ .................................................. H04N 1/23
[52] U.S. Cl. ........................... 358/302; 347/135; 347/255
[58] Field of Search .................. 355/77, 38, 40, 355/43, 45, 52, 35, 37, 67, 71, 18, 33; 358/296, 302; 347/134, 135, 255, 256

[56] References Cited

U.S. PATENT DOCUMENTS

| | | | |
|---|---|---|---|
| 3,756,718 | 9/1973 | Letzer | 355/32 |
| 3,758,207 | 9/1973 | Letzer | 355/80 |
| 3,761,171 | 9/1973 | Fields | 399/137 |
| 3,764,211 | 10/1973 | Morse et al. | 355/71 |
| 4,810,058 | 3/1989 | Sangyoji et al. | 349/2 |
| 4,870,357 | 9/1989 | Young et al. | 324/770 |
| 4,899,224 | 2/1990 | Ooba et al. | 386/42 |
| 4,903,068 | 2/1990 | Shiota | 355/20 |
| 4,933,773 | 6/1990 | Shiota et al. | 358/302 |
| 4,935,820 | 6/1990 | Patel et al. | 358/302 |
| 4,939,529 | 7/1990 | Kanayama et al. | 347/237 |
| 5,047,789 | 9/1991 | Kanayama et al. | 347/232 |
| 5,050,001 | 9/1991 | Hatanaka et al. | 360/60 |
| 5,084,727 | 1/1992 | Maronian et al. | 355/68 |
| 5,122,831 | 6/1992 | Suzuki | 355/37 |
| 5,181,015 | 1/1993 | Marshall et al. | 345/156 |
| 5,184,227 | 2/1993 | Foley | 358/302 |
| 5,204,617 | 4/1993 | Kumagai | 324/770 |
| 5,351,201 | 9/1994 | Harshbarger, Jr. et al. | 348/187 |
| 5,391,985 | 2/1995 | Henley | 324/158.1 |
| 5,400,152 | 3/1995 | Manico et al. | 358/501 |
| 5,424,802 | 6/1995 | Saita | 355/43 |
| 5,432,461 | 7/1995 | Henley | 324/770 |
| 5,444,385 | 8/1995 | Henley | 324/770 |
| 5,459,409 | 10/1995 | Henley | 324/770 |
| 5,465,052 | 11/1995 | Henley | 324/770 |
| 5,489,923 | 2/1996 | Marshall et al. | 345/156 |
| 5,504,438 | 4/1996 | Henley | 324/770 |
| 5,652,661 | 7/1997 | Gallipeau et al. | 358/302 |
| 5,754,305 | 5/1998 | DeClerck et al. | 358/302 |

FOREIGN PATENT DOCUMENTS 0 629 908   12/1994   European Pat. Off. .
8006181     1/1996    Japan .

*Primary Examiner*—Robert E. Nappi
*Assistant Examiner*—Derek J. Jardieu
*Attorney, Agent, or Firm*—Frank Pincelli; Gordon M. Stewart

[57] ABSTRACT

A method and apparatus for printing an image onto a photosensitive media. The apparatus includes an optical system having a light source for producing an exposure light; an imaging active matrix liquid crystal display through which the exposure light passes; a lens for focusing the exposure light passing through the active matrix liquid crystal display onto a photosensitive media; and a correction active matrix LCD is position between the imaging active matrix LCD and the light source for correcting non-uniformity in the optical exposure system.

17 Claims, 3 Drawing Sheets

METHOD AND APPARATUS FOR CORRECTING LIGHT NON-UNIFORMITY IN AN LCD PHOTOGRAPHIC PRINTER

FIELD OF THE INVENTION

The present invention relates to photographic printers which utilize a liquid crystal display for printing an image obtained from digital data.

BACKGROUND OF THE INVENTION

It is known, for example, from U.S. Pat. Nos. 4,935,820 and 5,050,001 to utilize a single crystal display to produce a color image on a photographic material. The LCD uses digital information obtained from scanning the negative or from any other source. The problem associated with the implementation of an LCD array for printing onto a photographic material is that light uniformity across the LCD varies across the device. In addition, uniformity of the LCD device can vary over time and temperature. The '820 patent suggests that corrections in luminations may be carried out by individual adjustment of the pixels of the LCD. A disadvantage of such an approach is that the dynamic range of the digital data of the LCD is reduced. An additional problem is that lower quality prints are produced due to the limited dynamic range of a single LCD.

The present invention provides a method and apparatus for digital printing onto photographic media which corrects for light non-uniformity of the exposure light. This, is accomplished by providing a second LCD in line with the imaging AMLCD and utilizing a calibration procedure for determining corrective values used to correct the non-uniformity.

SUMMARY OF THE INVENTION

In accordance with one aspect of the present invention there is provided an apparatus for printing an image onto a photosensitive media. The apparatus having an optical exposure system, comprising:

a) a light source for producing an exposure light;

b) an imaging active matrix liquid crystal display for producing an image through which the exposure light passes for printing the image onto a photosensitive material; and c) a correction active matrix liquid crystal display positioned between the imaging active matrix liquid crystal display and the light source for correcting non-uniformity in the optical exposure system.

In accordance with another aspect of the present invention there is provided a method for correcting light non-uniformity of an imaging system which uses an active matrix liquid crystal to expose an image on photosensitive media by passing exposure light through the active matrix liquid crystal display, the method comprising the step of:

adjusting the intensity of the exposure light to be passed through the imaging active matrix liquid crystal display at discrete locations in accordance with the light intensity distribution measured so as to compensate for the light non-uniformity.

In yet another aspect of the present invention there is provided a method for correcting the light non-uniformity of an optical system for exposing a photosensitive media, the optical system having an imaging LCD which is used to expose an image onto the photosensitive media from an exposure light which passes through the imaging active matrix liquid crystal display onto the media, the method comprising the steps of:

a) determining the light intensity distribution of the exposure light after it has passed through the imaging active matrix liquid crystal display; and b) adjusting the intensity of the exposure light to be passed through the imaging liquid crystal display utilizing the second corrective active matrix liquid crystal display in response to the intensity distribution previously determined.

DETAILED DESCRIPTION OF THE INVENTION

Figure 1:
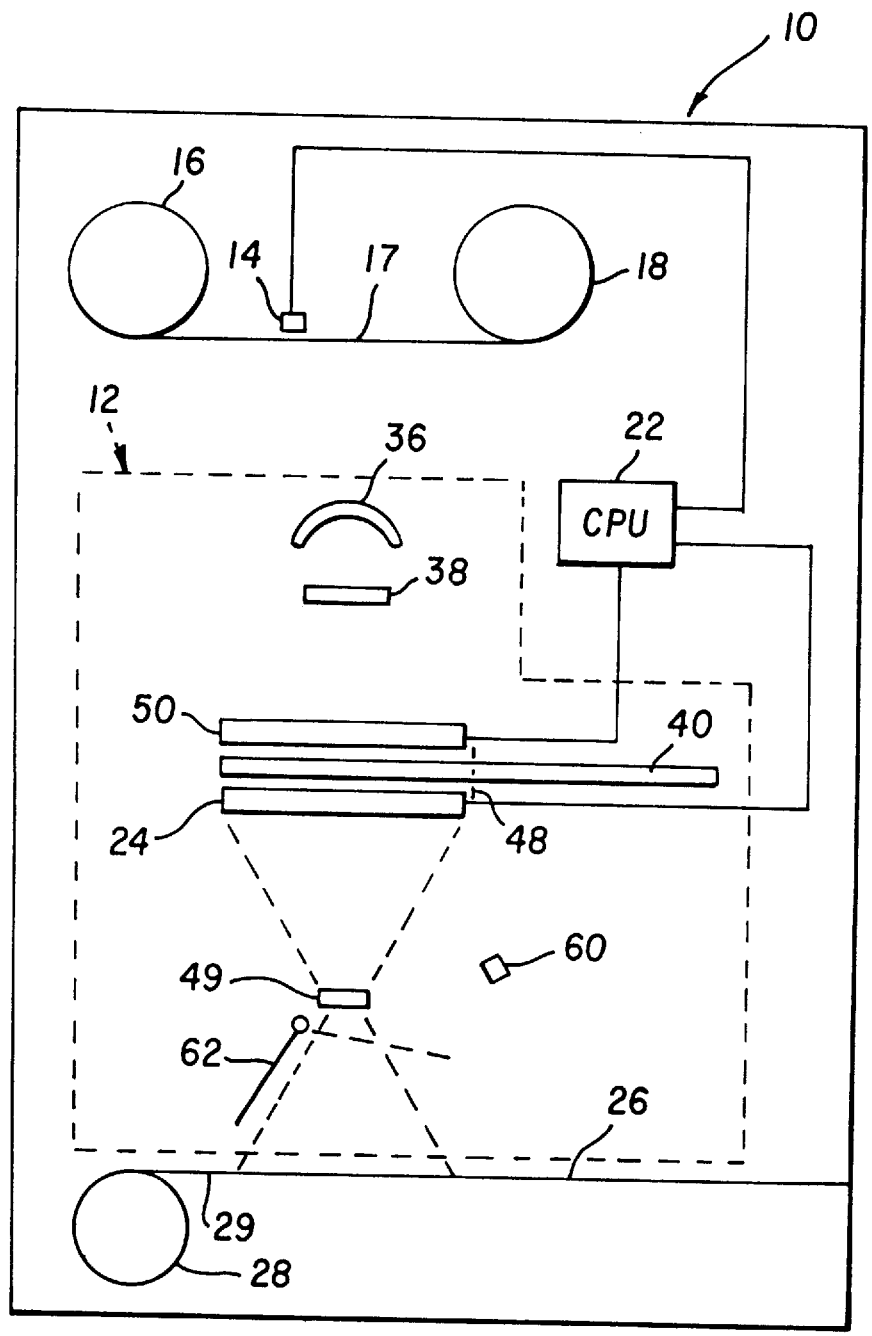
FIG. 1 is a diagrammatic representation of the printing apparatus made in accordance with the present invention.

Referring to FIG. 1, there is illustrated in schematic form a high speed photographic printing apparatus made in accordance with the present invention. In particular, the high speed photographic printing apparatus 10 includes a digital printing system 12. The apparatus 10 includes a supply reel 16 which comprises a plurality of strips of processed photographic film, each strip representing a single customer order which have been spliced together so as to form a long continuous web 17. A scanner 14 is provided for scanning of the web 17 as it passes thereby. In the particular embodiment illustrated, the scanner 14 comprises a CCD array (charged coupled device) which is used to obtain digital information representative of the images present on the web 17. The resolution of the scanner 14 is preferably equal to or greater than the resolution in the final printed image. The digital information obtained by scanner 14 is passed onto CPU (computer) 22. A take-up reel 18 is provided for taking up web 17 from reel 16. Appropriate mechanisms (not shown) are provided for moving web 17 from reel 16 to reel 18 as is well known in the art.

Figure 3:
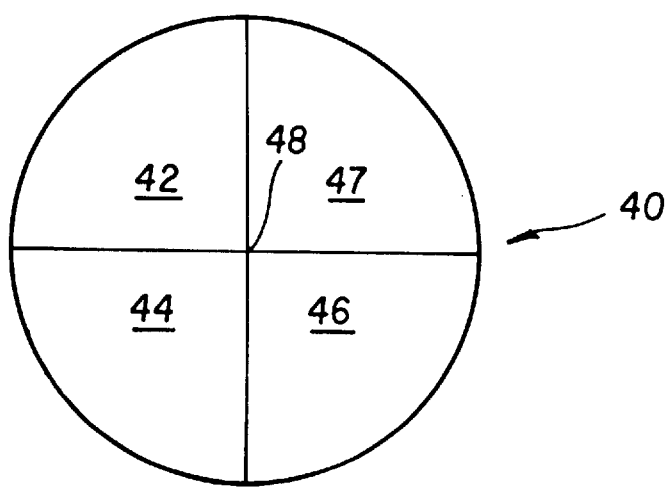
FIG. 3 is a plan view of the filter wheel of FIGS. 1 and 2.

The digital printing system 12 includes an active matrix imaging liquid crystal display 24 (AMLCD) which is used to provide images which can be exposed onto a photosensitive medium. In the particular embodiment illustrated, the photosensitive media comprises photographic paper 26 which is supplied by reel 28. Appropriate means are used for transporting the photographic paper 26 to the print gate 29 as is customarily done in prior art type photographic printers. The active matrix imaging liquid crystal display 24 comprises a monochromatic display having preferably a minimum number of pixels of 800×600. A suitable AMLCD may be purchased from the Epson Corporation, Part No. P13SM015. In order to provide a high quality image, the number and arrangement of the pixels of the AMLCD 24 should correspond to the number and arrangement of pixels in the CCD sensor 14. Preferably, this relationship is one to one or higher. The digital printing system 12 further includes a light source 36 for providing imaging light and an infrared cutoff filter 38 for eliminating undesirable portions of the light spectrum such that only substantially visible light is transmitted. A color filter wheel 40 is provided prior to the light reaching the active matrix liquid crystal display 24 and is used to color the image on the photosensitive paper 26. In particular, the filter wheel 40 (see FIG. 3) comprises filter sections 42,44,46 wherein filter section 42 is a blue pass filter, filter section 44 is a green pass filter, and section 46 is a red pass filter. By rotating filter wheel 40 about axis 48, the desired colored filter section may be placed between the light source 36 and the active matrix liquid crystal display 24 so as to generate a colored image onto the photographic paper. Wheel 40 is also provided with an opaque section 47 so as to block light from light source 36 from exposing paper 26 during non-exposure time of the digital printing process. A lens 49 is provided for focusing of the image produced by AMLCD 24 onto the photographic paper 26. The central processing unit 22, which receives the digital information obtained by scanner 14, is also used to control the various components of the apparatus, as is customarily done in the art, and also provides the appropriate digital data for producing of the images on the AMLCD 24.

In order to produce a single colored image on the photographic paper 26, it is necessary to rotate the filter wheel 40 and maintain the image on AMLCD 24 for an appropriate period of time so that each of the filter sections are exposed for the appropriate length of time. Applicants have found that when using the digital printing system, full color images can be exposed on the photographic paper within about 0.25 seconds.

A second liquid crystal display (LCD) 50 is provided and is used to provide correction factors for the non-uniformity of the illumination system and imaging system of the digital printer.

Figure 2:
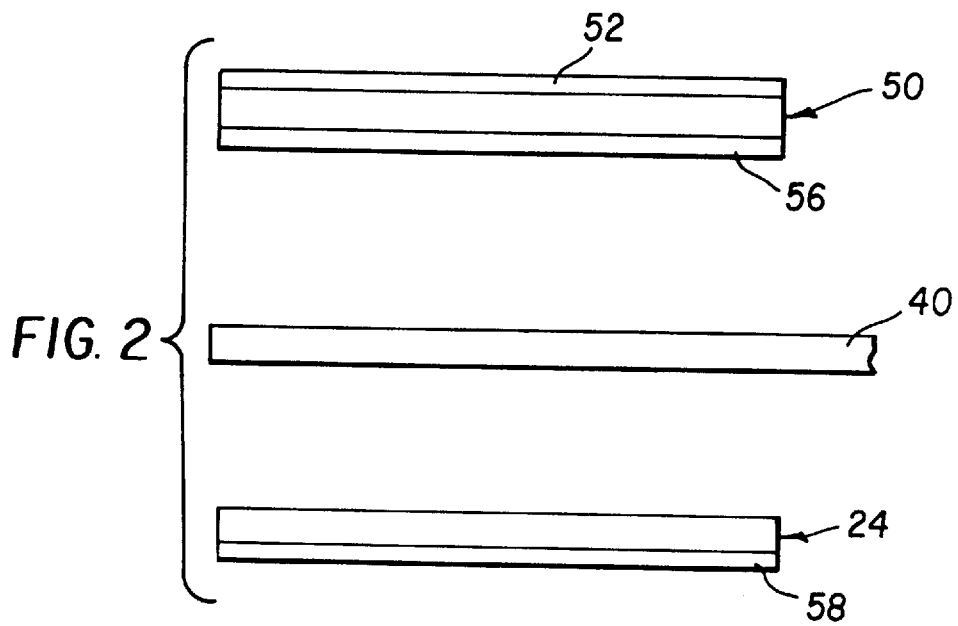
FIG. 2 is an exploded perspective view of the imaging section of the apparatus of FIG. 1 illustrating in particular the two AMLCDs and filter wheel disposed therebetween.

Referring to FIG. 2, there is illustrated in greater detail the imaging section of the printing system 12 which produces the images on the photosensitive paper 26. As is well known to those skilled in the art, an active matrix liquid crystal allows each of the individual pixels to be individually accessed such that the appropriate activation may be provided for each individual pixel. In a typical liquid crystal display assembly there is provided a first polarizer 52 which allows light to enter along a first axis. Each of the individual pixels are controlled by an appropriate voltage which in turn controls the polarization of each of the individual pixels. A second polarizer 56 is provided for controlling the output of the light from the AMLCD. The AMLCD may be set up for allowing clear transmission of light, in which case, by controlling the voltage, less light will be sent through the AMLCD or it can be of the black type whereby adjusting the voltage allows more light to be sent through the AMLCD. As is well known, the first polarizer 52 is at an angle of 90 degrees with respect to the second polarizer 56. Thus, by adjusting the voltage of each pixel of the AMLCD, the appropriate amount of light will be allowed to pass therethrough. Since two AMLCDs 24,50 are provided in the same optical path, one of the normally present polarizers can be omitted. Thus, in the present case the AMLCD 24 includes only a single polarizer 58. The AMLCD 24 is positioned such that polarizer 58 is at an angle of 90 degrees with regard to polarizer 56. By positioning AMLCD 24 such that polarizer 58 is at a 90 degree angle with regard to polarizer 56 of AMLCD 50, a second polarizer that would normally be associated with AMLCD 24 is eliminated. This increases the amount of light that is available to pass therethrough than would normally be present when two normal AMLCDs are replaced one after the other. However, if light is not a consideration, AMLCD 24 could be provided with two polarizers. While in the embodiments illustrated, AMLCD 50 has two polarizers and AMLCD 24 has one; this could be reversed so that AMLCD 50 has one polarizer and AMLCD 24 has two.

In the AMLCD printing system of the present invention, various light non-uniformities can occur. For example, over time, the imaging AMLCD and correction AMLCD will have natural non-uniformity due to the construction thereof. Additionally, temperature variations experienced by AMLCD from startup to normal steady state operation can result in non-uniformities. In addition, over time, individual pixel elements of the AMLCD can change uniformly or in a non-uniform manner. Also various other light non-uniformities can arise due to the lamp used in the light source or lenses used in the system. These non-uniformities can be compensated for by adjusting the signal sent to AMLCD 24. However, doing this results in a lower dynamic range that is available and a substantial loss of image quality.

Uniformity information needed for determining how to drive AMLCD 50 can be obtained by a number of ways. It is possible to make a photographic print of a known image (flat field) onto the photosensitive material using AMLCD 24. A densitometer could then be used to measure the density of the processed image. By densitometering the image at different locations on the print, a map of the light non-uniformity of the exposure light imaging system, can be generated. This information can be passed onto computer 22 whereby a compensating algorithm is used to calculate data for adjusting the level intensities of the corrective AMLCD 50. The problem with such an approach is that this requires a great deal of manipulation and cannot be done very quickly, and the photographic print must be developed, analyzed, and then later fed back to the CPU 22 for correcting and driving of the AMLCD 50.

Referring back to FIG. 1, there is illustrated a system wherein the non-uniformity information can be quickly and easily obtained through the use of a linear CCD array 60 and a rotating mirror 62. The rotatable mirror 62 is positioned such that it may swing between the normal non-calibrating position (position 1 as illustrated in solid lines), to the calibration position illustrated by the dashed lines). The mirror 62 is rotatably mounted to apparatus 10 such that the exposure light passing through the imaging system will be scanned so as to provide an intensity profile of the entire exposure light. In order to determine the uniformity of the light system, including the AMLCD 24, AMLCD 50 a calibration procedure is used. The calibration procedure starts by first placing AMLCD 50 in a first state which allows light to pass through AMLCD 50 without any restriction (i.e., the clear light mode). AMLCD 24 is placed in the dark (black) mode. The mirror 62 is moved from position 1 to position 2 allowing the CCD array 60 to scan the exposure light used for printing, thus obtaining appropriate intensity information for the illumination system. This information is used by the CPU 22 to provide a first offset correction pixel map. Next, the AMLCD 24 is placed in the substantially full condition (i.e., clear state). The mirror 62 is again moved from position 1 to 2 so as to scan the exposure light so as to determine a second pixel gain correction map. Using the information obtained for each of the two AMLCD 24 illumination states, a correction pixel map is determined by CPU 22. Thus exposure light intensity values are obtained for a plurality of very small individual discrete areas, by measuring individual pixels of the CCD array, which is representative of the entire exposure area.

Figure 5:
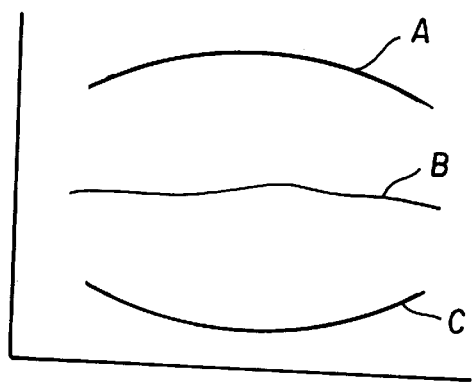
FIG. 5 is a graph illustrating three curves wherein one curve illustrates the uniformity of the illumination system, a second curve indicates the adjustment to be applied to the previous curve and the third curve indicates the light uniformity system after correction.

Referring to FIG. 5, there is illustrated a graph illustrating curve A which represents the system optical response based on the two pixel maps. In particular, as illustrated by FIG. 5, curve B illustrates the desired system response. Thus, an appropriate counter-measure curve C is determined for each pixel of the map so that the ultimate response obtained would be closely approximate curve B. Once this information has been calculated, this is used to drive active matrix liquid crystal 50. An initial corrective setting is then applied to AMLCD 50. Then, the prior described calibration procedure whereby the AMLCD 24 is placed at the black, and clear levels is repeated to produce a new pixel gain map. The result of this is compared with the desired curve. If further adjustment is required, these adjustments are calculated by the CPU and used to program the corrective liquid crystal display 50. This procedure is repeated until values for the pixel gain maps are within desired tolerance levels. If desired, a mid-level setting for AMLCD 24 can be obtained to verify the operating characteristics of the AMLCD 24.

Figure 4:
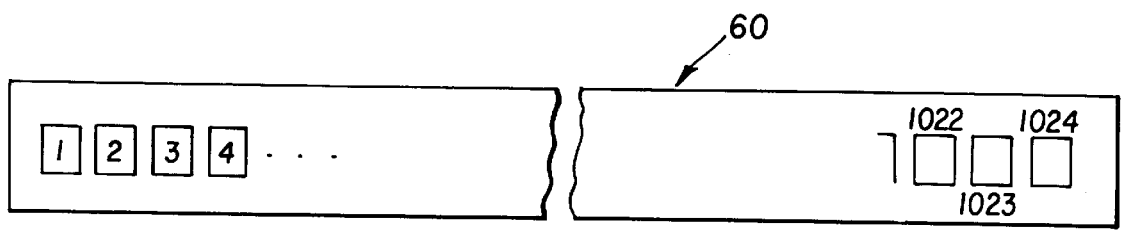
FIG. 4 is a diagrammatic representation of the front face of the CCD sensor used for calibrating the light non-uniformity in the printer.

Referring to FIG. 4, there is illustrated an elevational view of the charge coupled device 60 used for calibration of the illumination system. The mirror 62 is moved at a substantially constant velocity, either by a spring or a step motor (not shown) such that light is projected on the CCD array 60. The CCD array electronics (not shown), provide the needed clocking signals as well as data processing. This image data collected by array 60 is used to generate the pixel correction map previously discussed. In the preferred embodiment, linear CCD array 60 is used so as to minimize costs and avoid the cost of using a more expensive area CCD array. However, the present invention is not limited to a linear CCD array in which case the mirror 62 need only be placed in a second stationary position for properly projecting the exposure light onto the area CCD array so as to obtain the pixel map information pervasively discussed.

In the preferred form of the present invention a second active matrix crystal display is used to provide corrective measures at discrete locations to the exposure light, other means may be employed, for example, but not limited to, a filter mask that has been darkened in appropriate discrete areas. However, to make such a mask would require time and additional cost and therefore is not preferred at this time.

The present invention provides a method and apparatus for a digital printing system which corrects for light non-uniformity of the exposure light.

It is to be understood that various other changes and modifications may be made without departing from the scope of the present invention. The present invention being limited by the following claims.

| Parts List: | |
|---|---|
| 10 | printing apparatus |
| 12 | digital printing system |
| 14 | scanner |
| 16 | reel |
| 17 | web |
| 18 | take-up reel |
| 22 | CPU |
| 24, 50 | AMLCD |
| 26 | photographic paper |
| 28 | reel |
| 29 | print gate |
| 36 | light source |
| 38 | cutoff filter |
| 40 | color filter wheel |
| 42, 44, 46 | filter sections |
| 47 | opaque section |
| 48 | axis |
| 49 | lens |

| Parts List: | |
|---|---|
| 52, 56, 58 | polarizer |
| 60 | linear CCD array |
| 62 | mirror |

We claim:

1. An apparatus for printing an image onto a photosensitive media, said apparatus having an optical exposure system, comprising:

a) a light source for producing an exposure light;

b) an imaging active matrix liquid crystal display for producing an image through which said exposure light passes for printing said image onto a photosensitive material; and c) a correction active matrix liquid crystal display positioned between said imaging active matrix liquid crystal display and said light source for correcting light non-uniformity in said optical exposure system.

2. An apparatus according to claim 1 wherein said imaging active matrix liquid crystal display has an input polarizer for polarizing the exposure light entering the imaging active matrix liquid crystal display and a second output polarizer for polarizing the light exiting the imaging active matrix liquid crystal display, said imaging active matrix liquid crystal display being positioned in a first orientation, said correction active matrix liquid crystal display having an output polarizer for polarizing the light exiting the correction active matrix liquid crystal display, said correction active matrix liquid crystal display being positioned at a second orientation such that said output polarizer of said correction active matrix liquid crystal display is orientated with a polarization at 90 degrees with respect to the second output polarizer of said imaging active matrix liquid crystal display for polarizing the light exiting said imaging active matrix liquid crystal display.

3. An apparatus according to claim 1 further comprising control means for controlling and adjusting said correction active matrix liquid crystal display.

4. An apparatus according to claim 3 wherein said control means includes a sensor for measuring the light non-uniformity of said optical system and providing this information to said control means.

5. An apparatus according to claim 4 wherein said control means includes a computer for controlling the light intensity of said correction active matrix liquid crystal display in response to the information obtained by said sensor.

6. An apparatus according to claim 4 wherein said control means comprises a mirror rotatably mounted to said apparatus for movement between a first position and a second position for scanning said exposure light onto said sensor.

7. An apparatus according to claim 4 wherein a substantially constant velocity motor is used to rotate said mirror between said first and second positions.

8. An apparatus according to claim 4 wherein said sensor is a linear CCD array.

9. An apparatus according to claim 4 wherein said sensor is an array CCD array.

10. An apparatus according to claim 1 wherein said correction active matrix liquid crystal display includes a first input polarizer and a second output polarizer for polarizing the output light of said correction active matrix liquid crystal display, said imaging active matrix liquid crystal display having a single output polarizer disposed at 90 degrees with respect to said output polarizer of said correction active matrix liquid crystal display.

11. A method for correcting light non-uniformity of an imaging system which uses an imaging active matrix liquid crystal display to expose an image on photosensitive media by passing exposure light through said active matrix liquid crystal display, said method comprising the step of:

adjusting the intensity of the exposure light to be passed through said imaging active matrix liquid crystal display at discrete locations in accordance with a measured light intensity distribution of the imaging system so as to compensate for the light non-uniformity;

wherein the step of adjusting the intensity of the exposure light is accomplished by providing a correction active matrix liquid crystal display disposed between the light source and said imaging active matrix liquid crystal display and controlling said correction active matrix liquid crystal display so as to correct for the light non-uniformity.

12. A method for correcting a light non-uniformity of an optical system for exposing a photosensitive media, said optical system having an imaging active matrix liquid crystal display which is used to expose an image onto the photosensitive media from an exposure light which passes through the imaging active matrix liquid crystal display onto said media, said method comprising the steps of:

a) determining a light intensity distribution of the exposure light after it has passed through said imaging active matrix liquid crystal display; and b) adjusting the intensity of the exposure light to be passed through said imaging active matrix liquid crystal display utilizing a correction active matrix liquid crystal display in response to the intensity distribution of the exposure light previously determined.

13. A method for correcting the light non-uniformity of an optical system for exposing a photosensitive media, said optical system having an imaging active matrix liquid crystal display which is used to expose an image onto the photosensitive media from an exposure light which passes through the said imaging active matrix liquid crystal display onto said media, said method comprising the steps of:

a) determining a light intensity distribution of the exposure light after it has passed through said imaging active matrix liquid crystal display;

b) providing a correction active matrix liquid crystal display between the light source and said imaging active matrix liquid crystal display; and c) adjusting the intensity of the exposure light to be passed through said imaging liquid crystal display utilizing said correction active matrix liquid crystal display.

14. A method according to claim 13 wherein said intensity distribution of said optical system is obtained by producing a photographic print and measuring the image produced with a densitometer so as to obtain a light uniformity distribution map of said optical system.

15. A method according to claim 13 wherein said intensity distribution of said optical system is obtained by passing said exposure light onto a CCD array.

16. An apparatus for printing an image onto a photosensitive media, said apparatus having an optical system comprising:

a) a light source for producing an exposure light;

b) an imaging active matrix liquid crystal display through which said exposure light passes;

c) means for producing an image on said imaging active matrix liquid crystal display;

d) a lens for focusing said exposure light passing through said active matrix liquid crystal display onto a photosensitive media; and e) a correction active matrix liquid crystal display positioned between said imaging active matrix liquid crystal display and said light source for correcting non-uniformity in said exposure light.

17. An apparatus for printing an image onto a photosensitive media, said apparatus having an optical exposure system comprising:

a) a light source for producing an exposure light;

b) an imaging active matrix liquid crystal display for producing an image through which said exposure light passes for printing said image onto a photosensitive material;

c) a lens for focusing said exposure light passing through said imaging active matrix liquid crystal display onto a photosensitive media; and d) a correction active matrix liquid crystal display positioned between said imaging active matrix liquid crystal display and said light source for correcting non-uniformity in said exposure light.

* * * * *